July 28, 1936.     H. THOMAS     2,049,233
CONTROL SYSTEM FOR PIPE LINES
Filed Sept. 1, 1934     2 Sheets-Sheet 1

WITNESS:

INVENTOR
Henry Thomas
BY
Busser & Harding
ATTORNEYS.

July 28, 1936.   H. THOMAS   2,049,233
CONTROL SYSTEM FOR PIPE LINES
Filed Sept. 1, 1934   2 Sheets—Sheet 2

WITNESS:

INVENTOR
Henry Thomas
BY
Busser & Harding
ATTORNEYS.

Patented July 28, 1936

2,049,233

UNITED STATES PATENT OFFICE 2,049,233

CONTROL SYSTEM FOR PIPE LINES

Henry Thomas, Ridley Park, Pa., assignor to Sun Oil Company, Philadelphia, Pa., a corporation of New Jersey Application September 1, 1934, Serial No. 742,516

4 Claims. (Cl. 137—78)

The present invention relates to a control system for pipe-lines or similar fluid pressure or hydraulic systems but more specifically to automatic control systems for pipe-line booster stations.

In the operation of pipe-lines, particularly designed for petroleum products, it is common practice to have surge tanks at the pumping stations, or stations are placed in such location in the line that a certain natural reserve capacity is maintained in the line ahead of the station. Where surge or storage tanks are used at the stations, such tanks are, in effect, "floating" on the incoming line to the station. Such a tank allows a flow from the preceding station to come in at any rate, while the station in question also can take the oil at any rate, whether it is at the same rate, or at a higher or lower rate than is being supplied by the preceding station. Since the level in the tank serves to maintain a positive pressure on the suction on the pump, there is no danger of the pump "running dry" or of failing to get its proper supply of oil. Where such tanks are used, the average quantity of oil into and out of a station (meaning tank and station as a unit) must be equal, but it can vary up or down over a considerable period of time due to the reserve capacity in the tank. In such stations, the principal duties of the operators would be to see that the oil level in the tank is kept within certain safe limits, but the pumps could be controlled with the minimum amount of attendance.

In the case of booster pump stations where surge tanks are not used, however, the problem is to so control the operation of the pump or pumps that it will handle any amount of oil which is delivered to it and still keep the pump pressures within the safe and proper limits. Such a station has to take the flow from the preceding station at whatever pressure may exist and raise this pressure to a pre-determined higher pressure. It is usually desired to keep the suction pressure at the inlet of a pump to a relatively low value and to limit the discharge pressure at the station to the maximum safe working pressure on the line. It is generally found desirable to be able to control station operation to take care of flow rates as low as one-half of the maximum capacity of the line, occasionally almost to zero capacity and again up to the maximum capacity. This change in rate may occur over a relatively long period of time.

Centrifugal pumps, because of their characteristics, are especially well suited for the application of control devices. They are generally operated by constant speed motors, although they may be driven by engines or turbines. The centrifugal pump may also be driven at variable speeds by electric motor, engine or turbine.

In the operation of a pipe-line, especially one used for handling gasoline or other finished products, the rate through the line may vary to quite an extent, and, since the friction pressure drop of the liquid through the line is a function of the velocity or the rate of flow through the line, it is quite obvious that the conditions at the booster pump stations will vary as the rate of flow varies. Hence, it will be necessary to make changes in the adjustments of the valves to and from the pump (or in the speed of the pump in the case of variable speed drive). To illustrate this condition, let us assume that there are five pumping stations operating on a length of line. These stations are located 50 miles apart and all at approximately the same elevation. Between some of these stations there may be an outlet line which takes delivery from the pipe-line. The first station of the five takes its supply from a storage tank, the other four stations serve as boosters to raise the pressure in the line to give the required flow. With a given size line, and with a rate of 500 barrels per hour, each station will deliver the oil at a pressure of 800 pounds and deliver it to the following station at a pressure of 50 pounds. Assuming that at this rate throughout the length of the line the inlet valve to the pump and the outlet valve to the pump are wide open and the system will continue to maintain the same conditions with practically no change.

If, however, it is necessary, due to any condition at the delivery end or at the receiving end of the line, or any intermediate point in the line, to change the rate of flow through the line, it will be necessary to make changes in the valve settings at all or a part of the stations along the line. For example, if there is a side outlet from the line between #3 and #4 stations which may take 100 barrels per hour, then the settings of the valves at #1, #2 and #3 stations will remain practically the same as the original settings, while it will be necessary to readjust the valves on Stations #4 and #5, since there is now only 400 barrels per hour flowing through this part of the line and this change has brought about a difference in pressure drop and this can be taken care of only by varying the valve position (or by varying the speed of the pump) to give the same results.

Another example of changes which might occur is the case where the #5 station may not be able to deliver at the terminal end of the line the full flow which had been previously maintained. This will be brought about by the terminal end of the line closing against the flow. If they closed against the flow to a point where they received only 300 barrels per hour, then, of course, with no other outlets on the line, the entire line would have to be reduced to this same rate of flow. If no adjustments were made at the stations, the pressures built up along the line would become excessive and quite dangerous, since the flow has been reduced from 500 barrels per hour to 300 barrels per hour, and, as a result, the friction drop is reduced to about one-half of the previous friction drop and an excess pressure of between 300 and 400 pounds would build up between each station. Without a change in the adjustment of the stations, however, this would not appear as an excess of 300 to 400 pounds on each station but the pressure would be accumulated so that Station #5 would build up an excess pressure of 1500 to 1800 pounds, and the last stations on the line would have exceedingly high suction pressure, which would make it very dangerous to operate a pump. With the proper control at each station this excess pressure would be taken care of by throttling through the valves.

The above examples simply illustrate some of the conditions which may bring about changes requiring the readjustment of the station conditions. Many other changes which take place in the pipe-line system require readjustment of the station conditions, in some cases to prevent excessive pressures, in other cases to prevent damage to pumps due to lack of proper supply of the oil or liquid being handled.

There are many devices which have been used which would automatically shut down the pump in the case of pressures becoming too high or too low or to take care of other abnormal conditions. It is not the purpose, however, of this control to simply shut down the stations under these conditions, since shutting down a station does not always remove the dangerous condition. It is, however, the purpose to control the operation of each station to keep it within the safe operating limits under any operating conditions which may be brought about throughout the entire line. This control under certain conditions may even shut down certain pumps or stations. Such a shutdown might be governed by pressure, excess flow, or other abnormal conditions.

It is obvious from the foregoing that in the operation of a line carrying a liquid which, due to its incompressible nature, gives practically no elasticity to the operation of the system, that a change in one part of the system affects many or all of the other stations. Any form of manual control not only demands constant and undivided attention on the part of the operator but it would also result in uneven operation and flow of the pipe-line and in many cases might result in dangerous conditions.

I have discovered that certain control instruments well known in the art may be used to control a booster station in such a manner as to prevent damage to the pump and to maintain the flow in the pipe-line at such a rate as to meet the conditions at the other stations and of the line.

It is therefore an object of the present invention to provide a control system which is automatic and positive in operation, requiring a minimum of care and supervision and one, which if it should fail, will not result in damage to the pumping equipment or pipe-line generally. These and other objects will appear as the description progresses.

For an understanding of the invention, reference is made to the specification hereinbelow and to the drawings accompanying the same and forming a part thereof in which.

Figure 1:
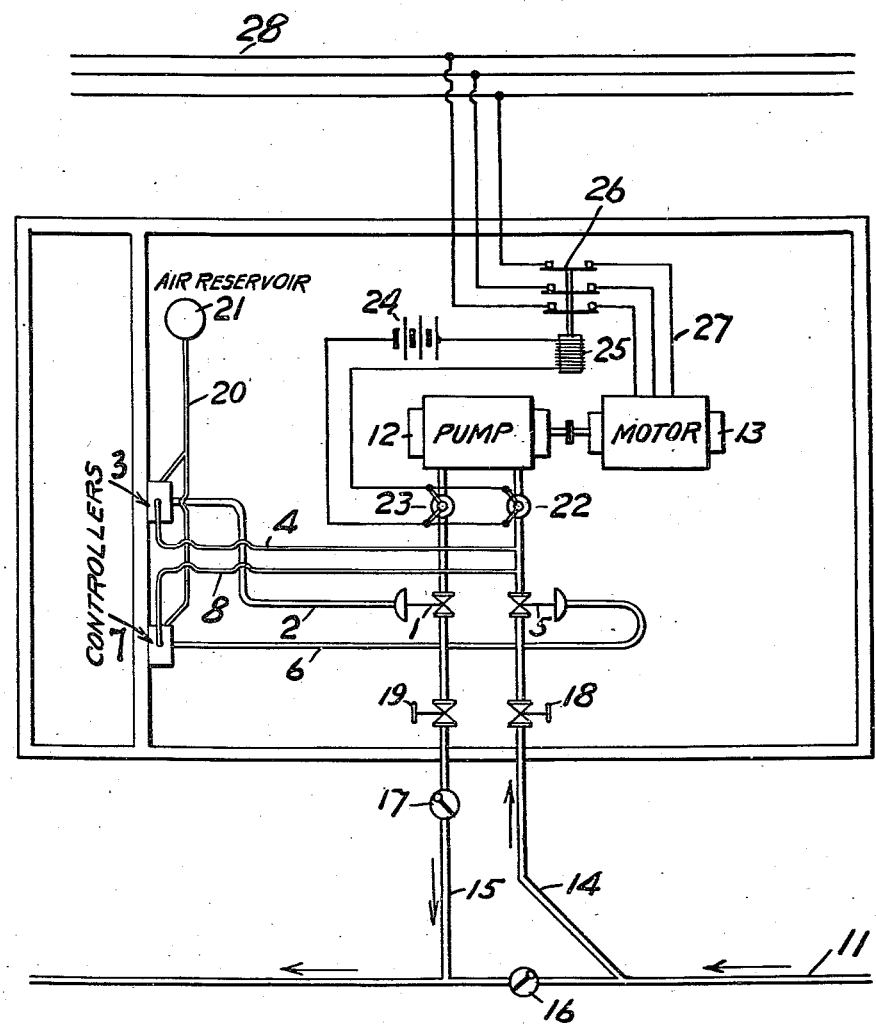
Fig. 1 is a diagrammatic representation of the system.

Referring now to the drawings:

11 represents a pipe-line through which fluid is being transmitted in the direction indicated by the arrows. A booster pump 12, which may be of any suitable type such as a multistage centrifugal pump of the type customarily used in booster stations, is operatively connected to and driven by a suitable prime mover here indicated as an electric motor 13, connected by leads 27 through switch 26 to a source of electrical energy as a power line 28. The pump 12 is connected to the pipe-line 11 by means of an inlet pipe 14 and an outlet pipe 15. Located in the pipe-line 11 between inlet pipe 14 and outlet pipe 15 is a check valve 16 which permits the fluid to flow directly through the pipe-line as soon as the station pump is cut off. There is also a check valve 17 placed in the outlet pipe 15 which prevents backflow into the station. Two manually operated valves 18 and 19 are placed in the inlet pipe 14 and outlet pipe 15 respectively, for manually controlling the flow if desired or for closing the lines to the station when not operating.

The pump 12 is designed to receive the fluid being transmitted through the pipe-line 11 at a fairly constant pressure, generally between 25 to 100 pounds and to increase the pressure of the fluid to the desired outlet pressure generally about 800 or 900 pounds.

In order that the inlet pressure to the pump may be maintained constant at the desired pressure, the balanced diaphragm valves 1 and 5 are placed in the outlet and inlet pipes 15 and 14 respectively. The valve 1 is operated by air which is fed and vented through line 2. The air for operating this valve or the venting of line 2 to relieve the pressure therein, is controlled by controller 3 which is operated by a capillary pressure line 4 extending from the inlet 14 between the valve 5 and the pump 12. The valve 5 is operated in a similar manner by air which is fed and vented through line 6. The air for operating this valve or the venting of line 6 to relieve the pressure therein, is controlled by controller 7, substantially identical with controller 3, and operated by a capillary pressure line 8 extending from the inlet 14 between the pump 12 and the valve 5. Air under pressure for operating the valves 1 and 5 is fed to the controllers 3 and 7 by means of the air feed line 20 from a suitable air supply source 21. The particular type of balanced diaphragm valves 1 and 5 form no part of the present invention and any suitable valves may be used.

Figure 2:
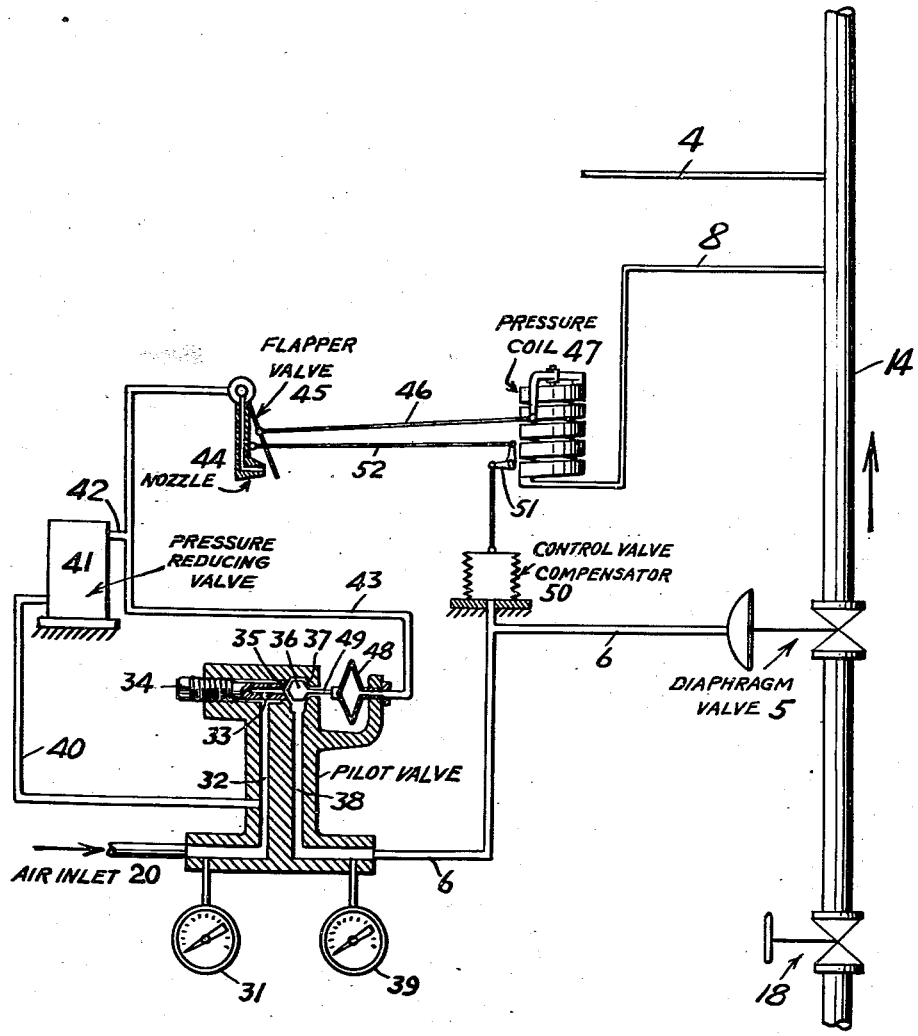
Fig. 2 is a diagrammatic representation of the control instrument, two of which are employed.

The controllers 3 and 7 may be of any desired type and construction and do not form part of the present invention, however for the sake of clarity there is illustrated in Fig. 2 the operating mechanism of one form of controller.

Referring now to Fig. 2:

The numeral 14 designates (as in Fig. 1) the inlet to pump 12. The line 14 contains manually controlled valve 18, valves 5 controlled by the controller 7, and capillary lines 4 and 8 leading to controllers 3 and 7 respectively. As hereinbefore pointed out, air for operating valves 1 and 5 is fed to and vented from the valves by the controllers 3 and 7. In Fig. 2 the operating parts of controller 7 only are shown.

Air is admitted to the controller 7 through line 20, its pressure being indicated by the pressure gauge 31, and passes through conduit 32 and port 33 in adjustable valve seat 34. Thence, assuming valve 36 to be raised from seat 35, it passes through conduit 38 and line 6 to the diaphragm motor controlling valve 5, thereby opening valve 5, the air pressure in conduit 38, line 6 and the diaphragm motor being indicated by pressure gauge 39. Simultaneously air is passing through line 40 from conduit 32 to pressure reducing valve 41 and thence through line 42 to branched line 43. One branch line 43 leads to nozzle 44, the orifice of which is controlled by flapper valve 45 which is operated by the pipe-line pressure operating through capillary tube 8, helix 47 and link 46. The other branch of line 43 passes to a diaphragm 48 which operates valve 36 by means of valve stem 49.

Assuming now that the pressure in line 14 leading to pump 12 is the desired pressure and correct and constant. In this case valve 36 will be seated on seat 37 thereby permitting the air pressure to maintain the controlled valve 5 in line 14 in a full open position. The pressure in line 14 will be transmitted through capillary tube 8 to helix 47 but, under the conditions above prescribed, will be insufficient to operate flapper valve 45 to close nozzle 44. Air passing through conduits 42 and 43 will thus be vented through nozzle 44. Assuming now that the pressure in line 14, between valve 5 and pump 12, rises above the desired limit. The pressure will then be sufficient to operate valve 45 to partly throttle opening in nozzle 44, permitting pressure to build up in line 43 and diaphragm 48. Diaphragm 48 then partly unseats valve 36 from seat 37, venting a portion of the air from lines 38 and 6 and permits the spring opposing the diaphragm in valve 5 to partly close valve 5 until the pressure in line 14 falls to its proper upper limit. Any sudden and great rise in pressure would, of course, completely close flapper valve 45 and nozzle 44 and thus close valve 5.

In order to prevent or minimize "hunting" or "over control" in the system, a control valve compensator is provided in the line 6 through which air is fed and vented from diaphragm valve 5. This control valve compensator consists of a differential pressure motor 50 connected to line 6, this motor is also connected through bell crank 51 and link 52 to air nozzle 44 which is mounted on a common axis with flapper valve 45. When the air is vented from line 6, due to an increase in pressure in pipe 14, as described above, the differential pressure motor, through bell crank 51 and link 52, will move air nozzle 44 about its axis away from flapper valve 45, thus preventing any over-control and causing the diaphragm valve 5 to close gradually. When the pressure in pipe 14 decreases the control valve compensator causes diaphragm valve 5 to open gradually and prevents the flapper valve from causing too great an opening of the diaphragm valve, and thus causing an over-travel and a hunting action in the system.

Controller 3 operates in substantially the same manner as controller 7, its parts being identical except that in controller 3 the helix is reversed as compared with helix 47 in controller 7. Briefly stated then, when the pressure in line 14 at the junction of capillary line 4 therewith is correct and constant, the valve 36 will be seated on seat 37 and pipe-line valve 1 will be held in its wide open position by the pressure of air admitted to the diaphragm in the valve through line 2. If the pressure in line 14 falls below a prescribed minimum, the helix in controller 3 will be operated to close flapper valve 45 thereby building up pressure in diaphragm 48 and moving valve 36 away from its seat 37 toward seat 35 thereby venting air from line 2 and permitting the spring in valve 1 opposing the diaphragm therein to partially or fully throttle valve 1.

The only difference between controllers 3 and 7 is the setting of the helices, the helix in controller 7 being set so as to operate the flapper to close it at pressures above, say 50 pounds and the helix in the controller 3 being set so as to operate its flapper to close at a pressure below say 40 pounds. Thus on failure of the air supply in line 21 the air in diaphragm controlled valves 1 and 5 and lines 2 and 6 would be vented either past valve seat 37 to the atmosphere or past valve seat 35 through lines 32 and 40, reducing valve 41, line 43 and nozzle 44 to the atmosphere, all depending on the pressure in lines 4 and 8. By this arrangement both of valves 1 and 5 would close, passing the pipe-line flow through check valve 16. Other devices described hereinafter would shut the motor and pump down.

In case of power failure the pressure in line 14 adjacent the junction of lines 4 and 8 would rise, thereby operating valve 5 to close it. Such action would cause the fluid in pipe-line 11 to flow through check 16 but its flow into outlet line 15 would be prohibited by check valve 17.

The operation of the control means is as follows:

Assume the pump 12 to be designed to operate with an inlet pressure within the range 40-60 pounds and the controllers 3 and 7 adjusted to maintain the inlet pressure within the desired range. Consider that the pressure in the inlet pipe 14 is within the desired range, the valves 1 and 5 are then wide open and the pump 12 is operating to boost the line pressure to 900 pounds.

If the inlet pressure drops, due to the station preceding it slowing down or an outlet in the line being opened, to below 40 pounds, this drop causes the capillary pressure line 4 to operate the controller 3 venting air from line 2 and thus operating valve 1 to throttle it, thereby cutting down the throughput through the pump 12 and raising the inlet pressure until it reaches its normal pressure range. Suppose now that the feed to the station has increased and has thereby raised the inlet pressure above 60 pounds. As the inlet pressure increases the pressure in the capillary tube 8 operates controller 7 to vent air from the tube 6 and throttle valve 5, thus cutting down the pressure to the inlet of the pump until it reaches its normal range.

The pump would normally operate with a variation in suction pressure of 15 to 20 pounds per square inch; therefore the operating pressures for actuating controllers 3 and 7 should be spaced apart by this amount. By so doing, it is to be noted that control valves 1 and 5 will not function at the same time. That is, if the inlet pressure falls, valve 1 may be completely closed, but valve 5 will remain wide open. If the inlet pressure begins to increase when valve 1 is wholly or partially closed the valve 1 will be opened sufficiently to maintain the inlet pressure at approximately 50 pounds per square inch until valve 1 is completely open. If the inlet pressure continues to increase valve 5 will then be operated to partially reduce it, and valve 5 may be closed or almost completely closed but valve 1 will remain wide open.

On the inlet line 14 a suitable low pressure trip 22 is installed, thus when any predetermined low pressure is reached, which is always much lower than the normal operating pressure, this trip will operate to close the circuit from a battery 24 through the solenoid 25 and open switch 26 thus cutting off the motor 13.

While it is preferred to have the controllers 3 and 7 vent air from the lines 2 and 6 respectively in order to throttle valves 1 and 5 so that in case of failure of the air supply the system will be shut off, permitting flow through check valve 16, it is apparent that the controllers and valves may be so designed as to admit air under pressure to the lines 2 and 6 to throttle the valves 1 and 5.

It is also apparent that suitable visible or audible signals may be installed at any desired points, to give a warning in case any part of the system fails to function.

While a certain or specific embodiment of the invention has been described it is apparent that equivalent or even different apparatus, whether electrical or fluid pressure, may be used for effecting the desired control of the inlet pressure without departing from the spirit or scope of this invention.

It is also to be noted that while the present invention has been described as specifically applied to oil transportation pipe-lines, it is just as applicable to all lines under pressure induced by pumps. Therefore when "pipe-line" is used specifically in the claims, it is meant to include any fluid carrying line having a pump associated therewith for boosting the pressure in such line.

What I claim, and desire to protect by Letters Patent is as follows:

1. In a pipe-line system, the combination of a pipe-line, a pump in said pipe-line, a bypass around said pump, a controlled valve in the inlet side of said pump, a controlled valve on the outlet side of said pump, means operable by an increase in pressure above a predetermined maximum on the inlet side of said pump to throttle said controlled valve on the inlet side of said pump, and means operable by a decrease in pressure below a predetermined minimum on the intake side of said pump to throttle said controlled valve on the outlet side of said pump.

2. An automatic control system for pipe-lines comprising in combination, a pipe-line, a pump in said pipe-line, a by-pass around said pump, a valve on the inlet side of said pump, means responsive to an increase in pressure on the inlet side of said pump to throttle said valve, a valve on the outlet side of said pump, and means responsive to a decrease in pressure on the inlet side of said pump to throttle said valve on the outlet side of said pump.

3. In a pipe-line system, the combination of a pipe-line, a pump in said pipe-line, a bypass around said pump, a diaphragm operated valve in said pipe-line on the inlet side of said pump, means for conducting operating fluid to said valve, means for controlling the admission of operating fluid to said valve, means responsive to an increase in pressure in said pipe-line on the inlet side of said pump to actuate said control means to admit operating fluid to said diaphragm valve to throttle it, a diaphragm operated valve in said pipe-line on the outlet side of said pump, means for conducting operating fluid to said second valve, means for controlling the admission of operating fluid to said second valve, means responsive to a decrease in pressure in said pipe-line on the inlet side of said pump to actuate said control means to admit operating fluid to said second diaphragm valve to throttle it.

4. In a pipe-line system, the combination of a pipe-line, a pump in said pipe-line, a by-pass around said pump; a valve in said pipe-line on the intake side of said pump, control means for the throttling of said valve, means responsive to an increase in pressure in said intake side to actuate said control means, a valve in said pipe-line on the outlet side of said pump, control means for the throttling of last named valve, means responsive to a pressure decrease in said intake side to actuate the last named control means.

HENRY THOMAS.